United States Patent [19]

Plumb

[11] Patent Number: 4,488,630
[45] Date of Patent: Dec. 18, 1984

[54] MOVABLE BARRIER APPARATUS
[75] Inventor: Edwin W. Plumb, Woodbury, Conn.
[73] Assignee: Gated Devices, Inc., Woodbury, Conn.
[21] Appl. No.: 276,162
[22] Filed: Jun. 22, 1981
[51] Int. Cl.³ .............................................. F16P 3/04
[52] U.S. Cl. ...................................... 192/134; 74/615
[58] Field of Search ........................ 74/613, 615, 616; 192/133, 134, 129 B, 130; 100/53

[56] References Cited

U.S. PATENT DOCUMENTS

| | | | |
|---|---|---|---|
| 2,566,243 | 8/1951 | Nyquist | 192/134 |
| 2,683,515 | 7/1954 | Horn et al. | 192/134 |
| 4,033,250 | 7/1977 | Pinkstaff | 74/615 |
| 4,036,343 | 7/1977 | McPhee | 192/134 |
| 4,279,335 | 7/1981 | Plumb | 74/613 |

Primary Examiner—Kenneth J. Dorner
Attorney, Agent, or Firm—Hayes & Reinsmith

[57] ABSTRACT

A movable barrier apparatus for a power press and the like and having a fluid circuit for controlling operation of a machine tripping device responsive to a predetermined sequence of rotary cam mechanism movements for positively locking the barrier in an operative position precluding operator access to the machine work area, the rotary cam mechanism cooperating with the circuit to render machine tripping valve means of the fluid circuit inoperative when the barrier is in a position other than its operative position.

18 Claims, 7 Drawing Figures

MOVABLE BARRIER APPARATUS

FIELD OF THE INVENTION

This invention generally relates to a safety apparatus for use with power operated machines and particularly concerns a safety barrier apparatus which monitors the machine work area to preclude access to a machine work area and additionally is capable of controlling machine cycling in a fail safe manner to preclude operator injury.

BACKGROUND OF THE INVENTION

The present state of the art has illustrated need for a fast, smoothly operating barrier apparatus which will continuously present a full view of the machine work area to an operator of a power operated machine such as a power press and the like and which will effectively preclude operator access to the work area even in the event of any machine malfunction or if the machine does not stop at top dead center, or top stroke, or in the event of a fluid line failure.

SUMMARY OF THE INVENTION

A compact, integral barrier apparatus is provided featuring a free falling barrier between an operator and machine work area before each normal stroke is effected and which will remain closed in locked operative position during machine cycling either during single stroke or repeat machine operation. The barrier is designed to operate at a higher average gate speed than known barrier type devices while at the same time achieving the seemingly incompatible aim of precluding operator injury in the event an operator's fingers, e.g., were in the path of the rapidly descending barrier. The terminal portion of barrier travel is cushioned. If any obstacle is within the work area of the machine, the barrier automatically renders the machine incapable of tripping to effect machine cycling. In addition to effectively eliminating any moving part hazard, actuating components of the apparatus of this invention, namely, machine tripping valves of a fluid circuit, are positively and mechanically locked in an inoperative condition until such time as a movable gate of the barrier is locked in position by mechanical interlocks. Such locking of the barrier gate is maintained until the machine stops normally at top stroke. In addition, a fluid circuit incorporated in this invention provides fail safe features whereby the gate is locked down mechanically and remains locked even in the event of a fluid circuit component failure or if the machine stops short of top stroke, or in the event of a fluid line failure.

A better understanding of the objects, advantages, features, properties and relations of this invention will be obtained from the following detailed description and accompanying drawings which set forth a certain illustrative embodiment and are indicative of the way in which the principles of this invention are employed.

DETAILED DESCRIPTION OF THE DRAWINGS

Figure 1:
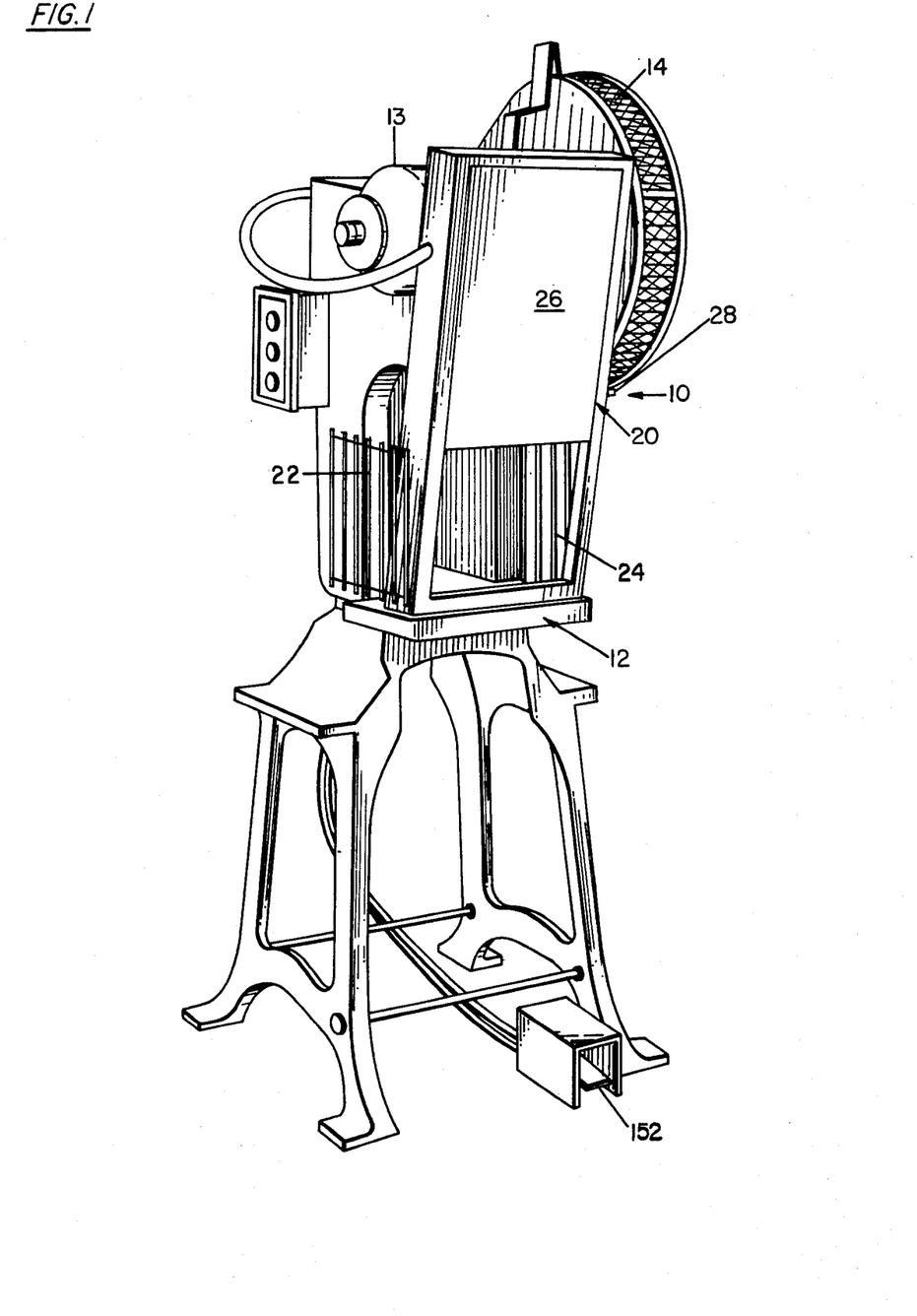
FIG. 1 is a front isometric view of a machine having an apparatus mounted thereon and incorporating this invention.

Referring to the drawings in detail, a power operated machine 10 is shown in FIG. 1 as having a frame 12 with tooling which will be understood to include a fixed work forming element such as a fixed die which cooperates with another movable work forming element such as a movable die, e.g., of a well-known type used in clamper machines, riveters, punch presses and the like incorporating an air friction clutch or mechanical clutch control. The movable work forming element is to be understood to be mounted on a reciprocating ram, not shown, driven from a suitable drive train including a motor 13 for driving a drive belt trained over a pulley and fly wheel mounted in housing 14 on frame 12. The clutch, not shown, is operatively mounted in a housing to alternately connect and disconnect the ram to the drive train to power operate the machine 10. With the clutch engaged, suitable controls, not shown, effect reciprocation of the ram in a conventional manner to drive the movable work forming element downwardly into engagement with a workpiece and to return that movable work forming element upwardly into a top stroke ready position to complete a subsequent work forming operation in a single stroke. A true single stroke cycle is normally the fashion in which machine 10 is operated whereupon the clutch is automatically released in timed relation to top stroke ram position to condition the machine for the next single stroke cycle. In machines of this type, a crankshaft of the drive train will rotate one revolution for the above described single-stroke operation to effect reciprocation of the ram. However, it is to be understood that machine 10 may also be operated on a continuous basis for primary operations.

In power-drive operated machines such as clamper machines, riveters, punch presses and similar machines with which this invention may be used, workpieces are typically positioned by hand in the work area of the machine for the single stroke work forming operation and thereafter may be manually or automatically removed from the work area to clear it for the next machine operation. Such machines operate at high speeds and typically exert a force sufficient to present extreme safety hazards when the machine is energized if an operator, for whatever reason, were to place his hands or fingers within the work area of the machine. While a variety of different approaches have been taken to prevent injury to an operator of machines of this general type, conventional safety devices have not always proven to be tamper-resistant and frequently have been found to be complex mechanisms incorporating costly time delay electrical circuitry, expensive to install and undesirably cumbersome while making the handling of workpieces awkward.

This invention is incorporated in a safety apparatus 20 designed to be quick and easy to install in simplified, rugged construction which permits complete operator visibility of the work area prior to operation of the machine 10 as well as during the actual work forming process wherein that work area is completely visible at all times to an operator and at the same time protects the operator from any physical hazard whatsoever. Moreover, the safety apparatus 20 is additionally tamper resistant, for the apparatus itself controls the machine cycling and positively and mechanically precludes such operation to reciprocate the ram under all conditions except upon receiving a signal indicative of an obstacle-free condition of the work area. Such condition of the work area is automatically determined by the safety apparatus 20 of this invention responsive to a manual act by the operator preliminary to automatic machine operation. Such automatic machine operation occurs only after the safety apparatus 20 itself determines that the work area is clear but for the workpiece to be formed.

In the specifically illustrated embodiment, the safety apparatus 20 is preferably hinged at the rear of side panels 22, 24 to the frame 12 of the machine 10 and a front panel closure 26 is secured to one side panel, such as 22, and may be quickly released in any suitable conventional manner, such as a latch 28 securing front closure 26 to the other side panel 24. Latch 28 serves to additionally hold the components of safety apparatus 20 closed whereupon the machine may then be run either single stroke or on a continuous basis. The side barrier panels 22, 24 are designed to admit strip or coiled stock to the work area behind the front closure 26. From the above description, it is to be understood that the apparatus 20 closes to its own frame and cannot be misadjusted to leave any hand clearance between the bottom of the front closure 26 and the machine frame 12. Latch 28 may be so designed that it cannot be opened until a fluid fitting is released to completely disconnect the apparatus 20 from the machine clutch and thereby render machine 10 inoperative.

Figure 2:
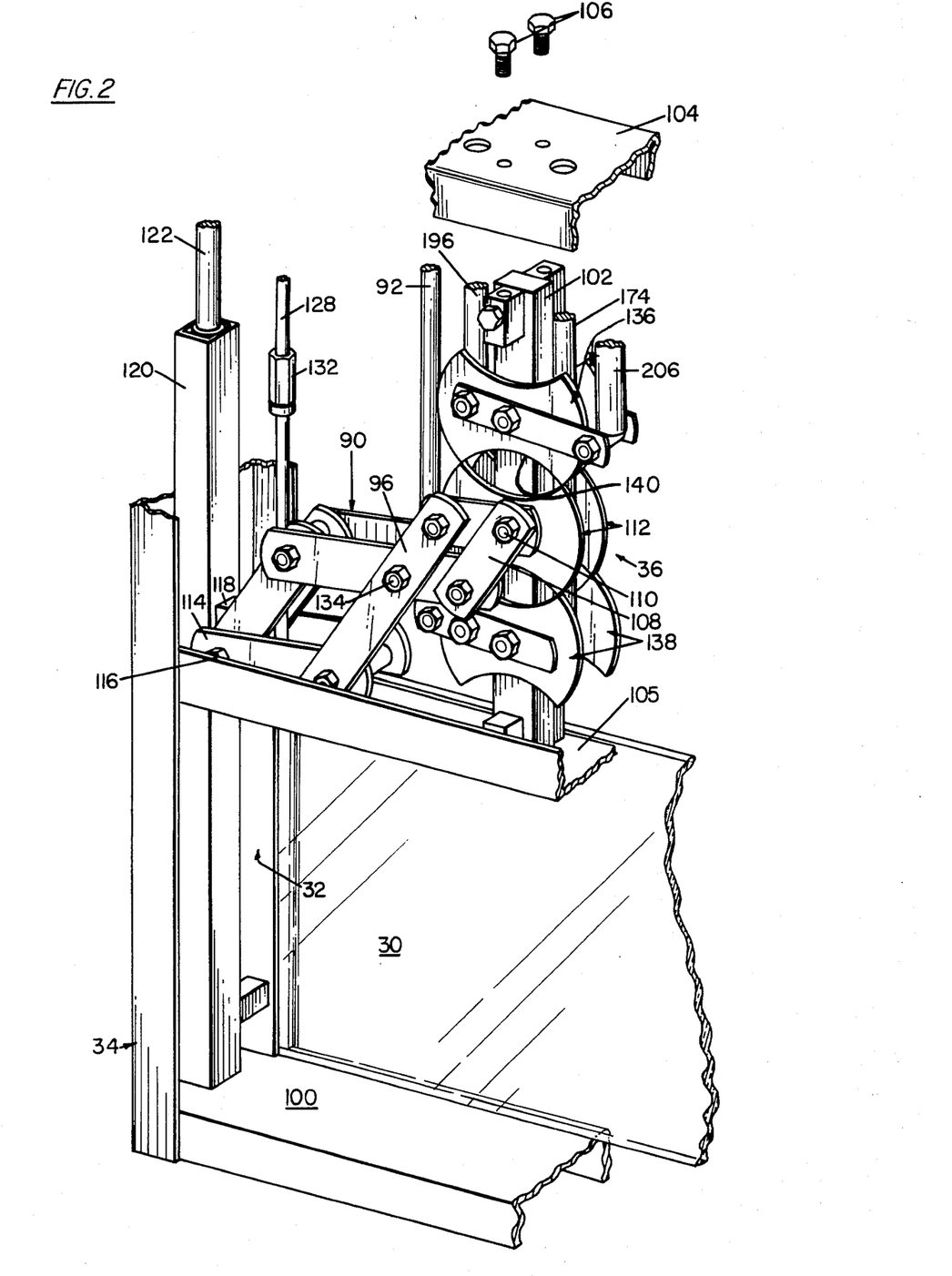
FIG. 2 is a front isometric view, partly broken away and partly exploded, showing a barrier operating and locking device incorporated in this invention.

In FIG. 2, a transparent high strength plastic gate 30 is shown mounted within a suitable track 32 of a front closure frame 34 for reciprocating vertical movement, and a barrier operating and locking device 36 is provided for moving the barrier or gate 30 between a starting position in remote raised relation to the work area, and its illustrated lower operative position in obstructing relation thereto, totally precluding operator access to the work area. As will be explained below, device 36 additionally releasably locks gate 30 closed in its operative position. Fluid circuit means (FIGS. 3-7) is connected to barrier operating and locking device 36 and to a machine tripping device, described below, for operating both of these devices whereby the tripping device is actuated by the fluid circuit means responsive to a signal from the barrier operating and locking device 36 indicative of gate 30 being in locked operative position.

The barrier operating and locking device 36 of this invention has been specifically designed to provide a high average gate speed through an initial freefall drop for about two-thirds of its travel and a gentle closing speed the remaining distance to a positive stop, free of any potential injury to an operator in the event his fingers, e.g., were under gate 30. In addition to operating at a higher gate speed than known devices without creating any operator hazard, a mechanical interlock arrangement is designed into the safety apparatus 20 of this invention whereby fluid circuit components controlling machine cycling are mechanically locked closed until gate 30 has fallen into its extreme downward operation position (FIG. 2), indicative of an obstacle-free condition of the work area, whereupon gate 30 is then locked down mechanically and will remain locked until the machine stops at top stroke. In the event there is any malfunction of the fluid control circuit or its components or if the single stroke mechanism does not operate or if the press ram does not stop at top stroke, the gate 30 will remain locked in accordance with this invention.

In the specifically illustrated embodiment of this invention, a pneumatic circuit layout is schematically illustrated in FIGS. 3-7, in association with barrier operating and locking device 36, wherein a compressed air source 38 is connected to supply line 40 having a control valve 42 and two valve supply lines 44, 46 connected to supply ports of valves 48 and 50, both of which are two position, three way pneumatic valves. Valve 48 is shown as a normally closed, pedal controlled valve. Valve 50 is a normally closed valve controlled by cam 52 (FIG. 3) which will be understood to be drivingly connected to the machine crankshaft and which cam 52 is shown in position when the machine 10 is at top stroke. Accordingly, cam operated valve 50 is normally held open when machine 10 is at top stroke. In the phase illustrated in FIG. 3, air passes through valve 50 through its outlet port, through a two position, three way pneumatic diverter valve 54 to feed downstream valves 56 and 58, through lines 59 and 60, and a machine cycling control cylinder 62 via line 64.

Valves 56 and 58 are illustrated as being two position, five ported, four way, pilot operated valves, and it will be understood that valve 58 is button actuated, such as by its valve stem 66, and that valve 56 is pilot returned, return pilot 68 being an override as it is greater in diameter than pilot operator 70. Valve 58 feeds pilot operator 70, and also pilot 72 of valve 74 via passages 76 and 78, valve 74 also being a two position, five ported, button operated, pilot returned valve which will be understood to have a three way mode of operation since its port 80 is plugged. The supply of air to pilots 70 and 72 of valves 56 and 74 produce an output signal pressure via line 76 and line 78, so that valves 56 and 74 shift to the positions shown. Each valve in the illustrated schematic fluid control circuit will be understood to be detented and remains in either of its two positions until a force is applied to shift the valve to its opposite position. As explained fully below, valve 56 serves as a gate linkage control valve and valve 74 serves as an interlock control valve.

Gate linkage control valve 56 supplies air via line 82 to a port below a piston 84 of a gate drive cylinder 86 and vents air above that piston 84 through line 88 to atmosphere through vent port 90 of valve 56.

To provide drive input to a pantograph mechanism 90 of barrier operating and locking device 36, a rod 92 of piston 84 passes through an apertured square block connector 94 pivotally mounted on link 96 of the mechanism 90, and nuts 98 on a lower terminal end of piston rod 92 contact a lower surface of the connector 94 to hold the gate linkage of mechanism 90, and consequently gate 30, in a raised starting position, not shown, in spaced apart relation to base 100 of track member 32. The linkage of mechanism 90 is suitably mounted (FIG. 2) on an upright bar 102 fixed to front panel members 104, 105, by suitable fasteners 106 with short link 108 mounted on a fixed pivot pin 110 secued to upright bar 102. Pivot pin 110 also supports a master interlock cam assembly 112 for rotation, the latter being an integral part of the gate linkage of mechanism 90. It will be understood that each of the illustrated pantographic links are pivotally connected in a conventional arrangement to one another, and an outboard end 114 of the pantograph mechanism 90 is shown terminating at a pivot 116 connected to a block 118 attached to a carrier 120 bearing gate 30 and slidably mounted for vertical reciprocating movement on guide rod 122 which is fixed to front panel 26.

Figure 3:
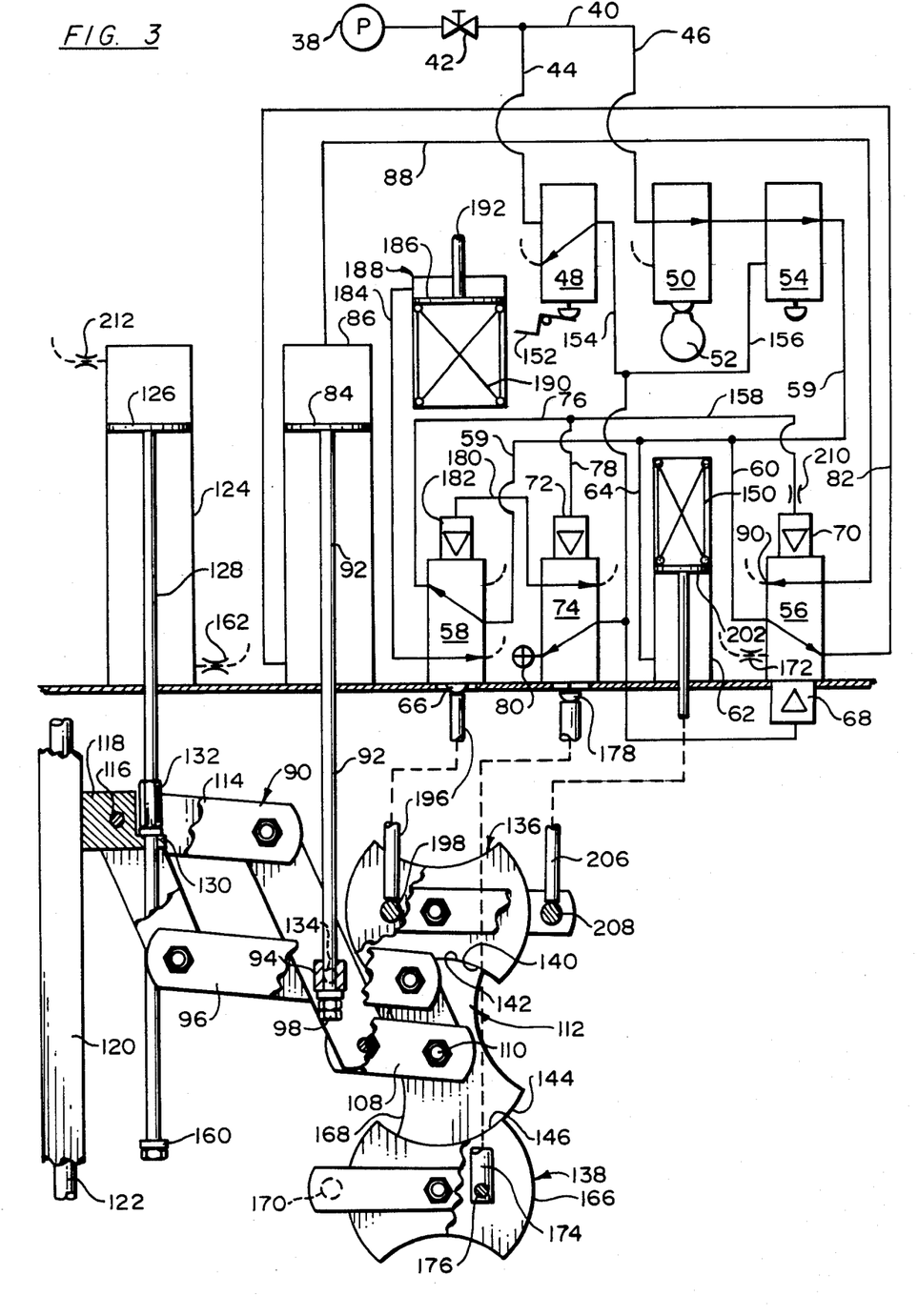
FIGS. 3-7 are schematic views of the barrier operating and locking device of FIG. 1 and an associated fluid control circuit in a sequence of different operating phases of a machine cycle.

To maximize the average gate speed in a free fall, and at the same time, provide a cushioned, gentle, gate closing speed that cannot injure an operator, a buffer cylinder 124 is fixed relative to to the front panel 26 and is shown in FIG. 3 having a piston 126 disposed in its upward limit of travel and a downwardly extending piston rod 128 which passes through an oversized aperture in an extension 130 of block 118 for relative sliding movement. A cylindrical boss 132 on rod 128 is in contact with the upper surface of the block extension 130, thereby holding piston rod 128 in cylinder 124 at its upper limit of travel.

As best seen in FIG. 2, pivot 116 at the outboard end 114 of pantograph mechanism 90 is guided in a straight line vertical path thereby causing pivot 134 of mechanism 90 to also move in a straight line vertical path. The mechanism has been specifically designed to permit pivot 134 one-third the amplitude of travel of pivot 116. The master interlock cam assembly 112 of the of gate linkage shown in a position (FIG. 3) such that it locks a pair of upper and lower cam assemblies 136, 138 from rotation in the machine phase illustrated in FIG. 3. The upper and lower cam assemblies 136, 138 are similar in construction to those disclosed in my U.S. patent application Ser. No. 24,709 filed Mar. 28, 1979 and entitled "Safety Device Having Machine Drive Cam Control".

More specifically as seen in FIG. 2, each of the described moving parts of the pantograph gate linkage mechanism 90 and the cam interlock assemblies 136, 138 has a twin (on the hidden side in FIGS. 3-7). The upper cam assembly 136 comprises a pair of cam plates respectively having corresponding profiled concave cam surfaces 140. These cam plates are maintained in aligned spaced relation to one another by crosspins, not shown, and suitable fasteners to secure the cams in assembly; a like arrangement is provided for the lower cam assembly 138. In the specifically illustrated embodiment, a start position is established (as shown in FIG. 3 in a predetermined angular position) by gate linkage pantograph mechanism 90 with the master interlock cam assembly 112 having its upper convex cam surfaces 142 and its lower convex cam surfaces 144 respectively engaging the lower and upper concave cam surfaces 140 and 146, respectively, of the upper and lower cam assemblies 136 and 138. Accordingly, the master interlock cam assembly 112 is in such a position that it positively mechanically locks both the upper and lower cam assemblies 136, 138 against rotation.

In the phase shown in FIG. 3, wherein the gate 30 is in raised starting position with the machine 10 idling at rest, the machine cycling control cylinder 62 is held by air pressure in its illustrated upper limit of travel against its internal spring 150 and is in an idle condition.

Figure 4:
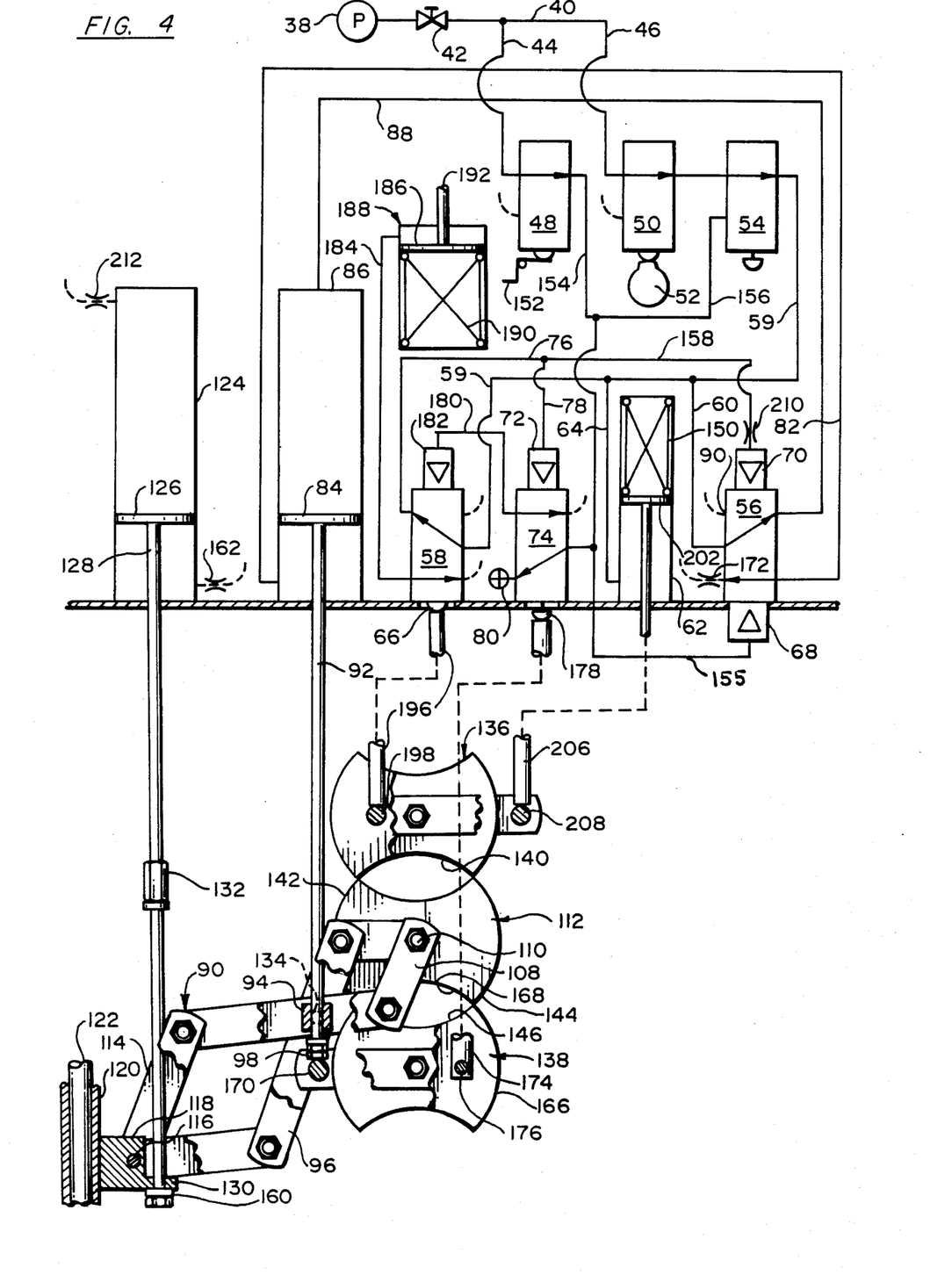

Turning now to FIG. 4, the condition of the fluid circuit and the barrier operating and locking device 36 is shown after initiation of a single stroke cycle with machine 10 idling at rest. With the machine 10 energized and with the closure panels 22, 24 and 26 mounted and latched in locked position, the fly wheel may be rotated and a workpiece may be properly positioned manually on a fixed die, e.g., and machine operation thereafter is initiated by an operator pressing a foot pedal 152. Upon manually operating pedal 152, the gate 30 initially free falls toward its operative, locked position shown in FIG. 2. More specifically, the normally closed, pedal controlled valve 48 is opened by manual actuation of the foot pedal 152, admitting air directly from valve 48 to valve 74 and to diverter valve 54 via line 154 and line 156, as well as to the pilot 68 of gate linkage control valve 56 via lines 154 and 155.

Air supplied to pilot 68 causes gate linkage control valve 56 to shift and overcome its smaller diameter pilot 70, which remains activated, and effects reversal of the supply and exhaust line connections 82 and 88 to the gate drive cylinder 86 causing its piston rod 92 to extend a predetermined distance, say, two and two-thirds inch, moving nuts 98 on the end of its piston rod 92 downwardly precisely that same distance. The square block connector 94 effects a following movement under the influence of gravity and, if desired, accelerating springs, not shown, on gate carrier 120. Due to the 3:1 ratio of the pantograph mechanism 90, pivot point 116 will move downwardly eight inches, lowering gate 30 to its extreme limit of travel. During such movement, the extension 130 of block 118 at pivot point 116 (which is slidable on piston rod 128 of buffer cylinder 124), will also move eight inches. However, after an initial free fall drop, the extension block 130 contacts a buffer washer and nut assembly 160 on the end of rod 128 after, say, about a five inch travel. Piston 126 and piston rod 128 of buffer cylinder 124 are then carried downwardly during the remaining three inches of gate linkage travel and drive the air trapped below piston 126 through a line restriction 162 downstream of a lower vent port in buffer cylinder 124 to cushion gate descent and soften any blow in the event an operator's fingers were in underlying relation to the descending gate.

The master interlock cam assembly 112 accordingly rotates in timed relation to its associated gate linkage, during gate travel, into the illustrated position in FIG. 4 where assembly 112 is disposed in a position permitting rotation of the upper and lower cam assemblies 136 and 138. The master interlock cam assembly 112 arrives at this position in synchronism with the arrival of gate 30 in its operative position, meanwhile preventing any rotation of either the upper or lower cam assemblies 136, 138 unless gate 30 is fully lowered down to its operative position indicative of an obstacle free condition of the work area.

Figure 5:
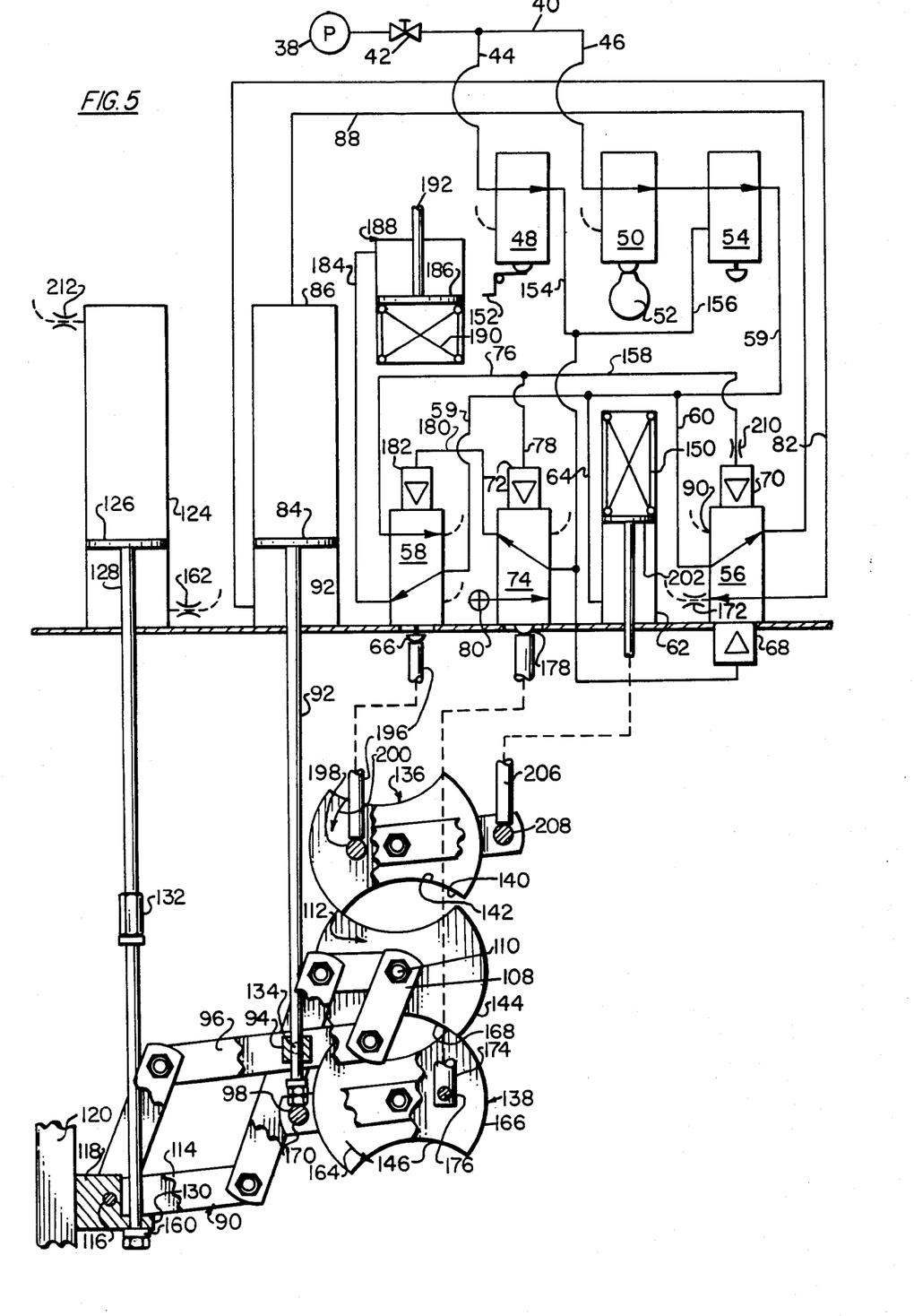

In FIG. 5, the barrier operating and locking device 36 and associated fluid circuit is depicted wherein the machine 10 is tripped for operation with gate 30 down in locked operative position. It will be noted that piston 84 of gate drive cylinder 86 has completed its travel to its lower limit position (about a three inch travel in the example illustrated), and nuts 98 on the end of the gate drive cylinder piston rod 92 moves slightly out of contact with the bottom surface of the square block connector 94 pivotally mounted on link 96 of the pantograph mechanism 90 to bear upon cross pin 170 secured between the cam plates of lower cam assembly 138, thereby rotating it counterclockwise in the direction of arrow 164 to meshingly engage convex cam surface 166 of lower cam assembly 138 and the concave cam surface 168 of master interlock cam assembly 112.

By virtue of the above described construction, it will be seen that the described operating and locking device 36 for the barrier or gate of this invention will automatically prevent the interlock cam assemblies 136, 138 from rotating if gate 30 is not lowered into its operative position and accordingly provides a fail safe sensing function in the event of any obstruction, such as an operator's fingers; conversely, upon the lower cam assembly 138 rotating into meshing engagement with master interlock cam 112 as illustrated in FIG. 5, such engagement effectively precludes rotation of the master interlock cam 112 in a clockwise direction (tending to raise gate 30) and locks gate 30 in its lower operative position.

To ensure smooth, uninterrupted gate travel into operative position under obstacle-free conditions, it is desired to synchronize the descent of piston rod 92 of gate drive cylinder 86 to movement of the falling gate, to ensure that piston rod 92 does not overrun gate 30 and engage pin 170 prematurely before gate 30 is down and the master interlock cam assembly 112 is properly aligned to permit the above described rotation of lower cam assembly 138. Such a result is preferably achieved by controlling and throttling exhaust air below the descending piston 84 in drive cylinder 86 through an adjustable choke or vent line restriction 172 of gate linkage control valve 56.

To provide an additional valve interlock fail safe feature, wherein lower cam assembly 138 is positively precluded from moving into an unlocked condition relative to master interlock cam assembly 112, and at the same time conditioning the fluid circuit to actuate a machine tripping device, a solid steel connecting plunger 174 is suitably supported on the front panel 26 for reciprocating vertical movement on a cross pin 176 between the plates of lower cam assembly 138 such that upon counterclockwise rotation of assembly 138, the plunger 174 moves vertically upwardly into engagement with a valve button actuator or stem 178 shown at the base of the machine tripping or interlock control valve 74 for shifting that valve into the position illustrated in FIG. 5 to overcome the line pressure of the air admitted through its pilot 72 and to supply air via line 180 to pilot 182 of machine tripping or cycling control valve 58. Valve 58 then shifts, as illustrated, to supply air through line 184 to drive piston 186 of machine tripping cylinder 188 against the bias of its internal return spring 190. Piston rod 192 will be understood to be connected to a clutch, not shown, of the machine 10 to effect cycling. In a power press, e.g., having a mechanical clutch, piston rod 192 may be connected to a spring actuated clutch latch for releasing that latch to permit clutch engagement for a single stroke through one revolution of its crankshaft, whereupon the latch automatically re-engages the clutch under the influence of the latch spring to terminate the machine cycle at top stroke.

As illustrated in FIG. 5, pilot 182 must extend valve stem 66 downwardly upon shifting of the valve 58 and, by means of a solid steel connecting plunger 196 engaging cross pin 198 between plates of the upper cam assembly 136, rotate that assembly 136 counterclockwise in the direction of arrow 200 in FIG. 5. Accordingly, if gate 30 is not in its operative position, such action and the consequent tripping of machine 10 cannot take place due to interference of the master interlock cam assembly 112 of the gate linkage mechanism 90; conversely, once upper cam assembly 136 has so rotated, the master interlock cam assembly 112 is effectively precluded against undesired clockwise rotation by the upper cam assembly to securely maintain gate 30 in locked operative position by both the upper and lower cam assemblies 136, 138. Once the machine tripping valve 58 shifts, the pilots 70 and 72 of valves 56 and 74 vent to atmosphere through a vent port of valve 58 via lines 76, 78 to positively deactivate the valve pilot operators 70, 72 and preclude inadvertent shifting of their respective valves to their opposite position and accordingly lock these control valves in position.

Even if an operator were to remove his foot from pedal 152 at any time after this point in the cycling, pilot 72 of valve 74 cannot exert any pressure through its stem 178 and plunger 174, to unlock lower cam assembly 138, the gate linkage control valve 56 cannot shift back and reverse line connections to gate drive cylinder 86.

Figure 6:
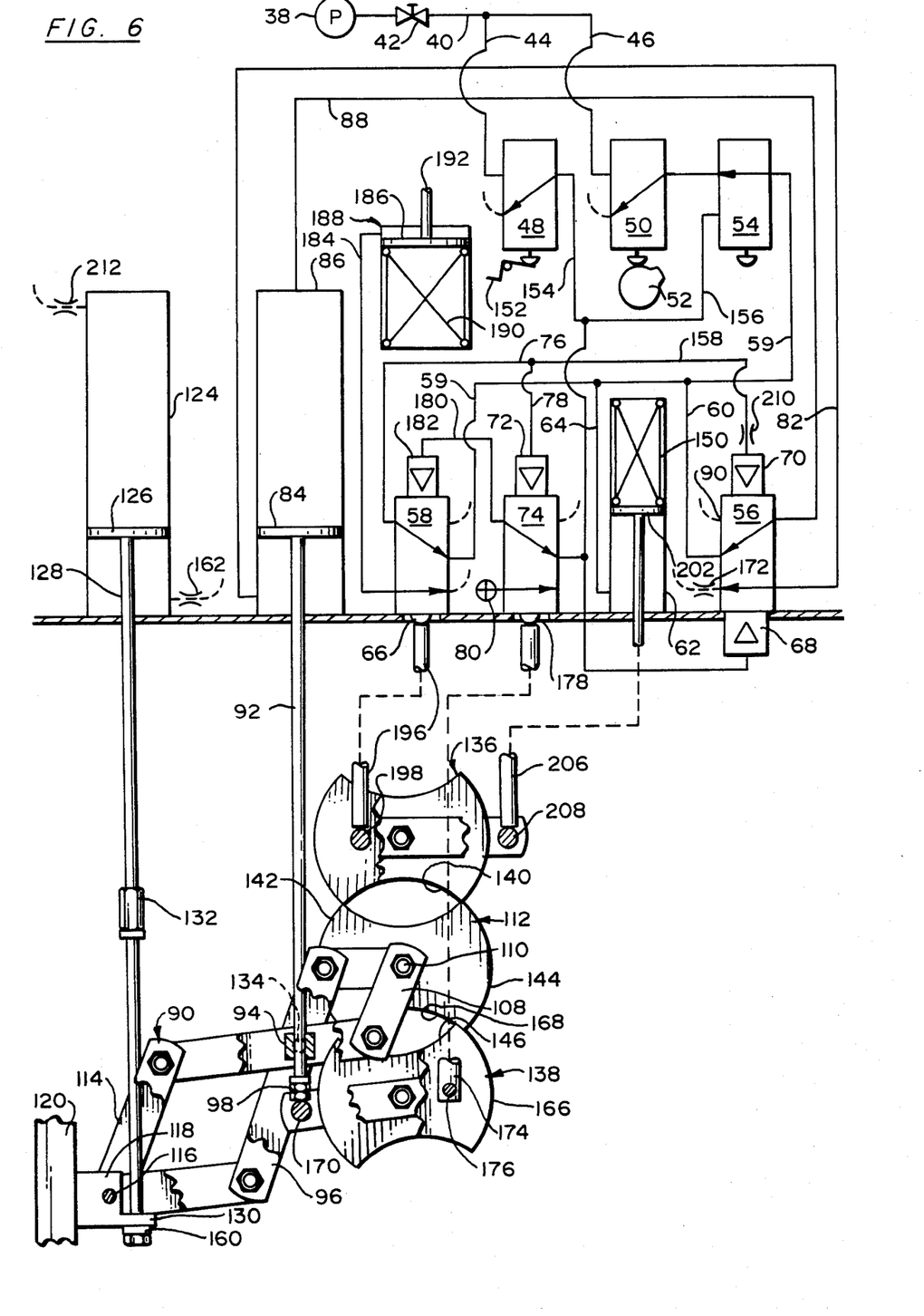

FIG. 6 depicts the barrier operating and locking device 36 and its associated fluid circuit during machine cycling with gate 30 in locked down operative position. The machine 10 which is tripped in FIG. 6 is now cycling and its crankshaft turns to rotate cam 52 and close the normally open, cam controlled valve 50 to exhaust air from the circuits it controls. As illustrated, foot pedal 152 is also shown released to close the normally closed pedal controlled valve 48.

Whether or not the operator has in fact released foot pedal 152 will not alter the operation during this phase of the cycle which effects the single stroke characteristics of the apparatus, i.e., the capability of apparatus 20 to limit the machine strokes resulting from one machine trip signal to one stroke.

Pilot 182 which shifted the machine cycling control valve 58 (in FIG. 5) is a return pilot, whereupon receiving an air signal, its piston moves forward, shifting the valve and then returning, even though its air signal is still on. Pilot 182 will not exert further shifting pressure on valve stem 66 until its air signal is removed and thereafter restored. Since valve 58 (and valves 56 and 74) are detented valves, they each remain in the last position to which they were shifted until a further valve actuating force reverses the valve position. Accordingly, the machine cycling control valve 58 at this stage is free to be shifted even though there may be an active air signal to its pilot 182 through valves 48 and 74 if the operator has not released the foot pedal 152 permitting closure of valve 48.

As the rotating crankshaft permits cam controlled valve 50 to close, air vents through valve 50 via valve 54, lines 59, 60 and 64 to exhaust the machine cycling control valve 58, the gate linkage control valve 56 and machine cycling control cylinder 62. Exhausting air from gate linkage control valve 56 also allows air to exhaust above piston 84 of the gate drive cylinder 86. The latter, however, remains unchanged due to the fact that no force is applied to move its piston rod 92 upwardly; i.e., under the force of friction and gravity, the piston rod position is unchanged and the lower cam assembly 138 remains in position, locking gate 30 down in operative position.

Exhausting air from the machine cycling control valve 58 is incidental and temporary as valve 58 will shift almost simultaneously as noted below.

Exhausting air from machine cycling control cylinder 62 causes its spring 150 to depress piston 202 and its rod 204 extends downwardly to actuate plunger 206, attached to piston rod 204, to bear against cross pin 208 between plates of upper cam assembly 136 and rotate that assembly clockwise, as viewed in FIGS. 5 and 6, raising plunger 196 to shift valve 58 which then exhausts machine tripping cylinder 188, terminating the trip signal to machine 10.

Should machine cycling control valve 58 stick or malfunction, for any reason, and not shift under command from cylinder 62, a potentially unsafe condition could result as valve 58 is the circuit component that actually trips machine 10. However, a monitor is automatically achieved by the above described construction since the upper cam assembly 136 mechanically monitors valve stem 66 of valve 58 which, if it does not return, likewise prevents return of upper cam assembly 136 whereby gate 30 is maintained in locked down operative position.

Figure 7:
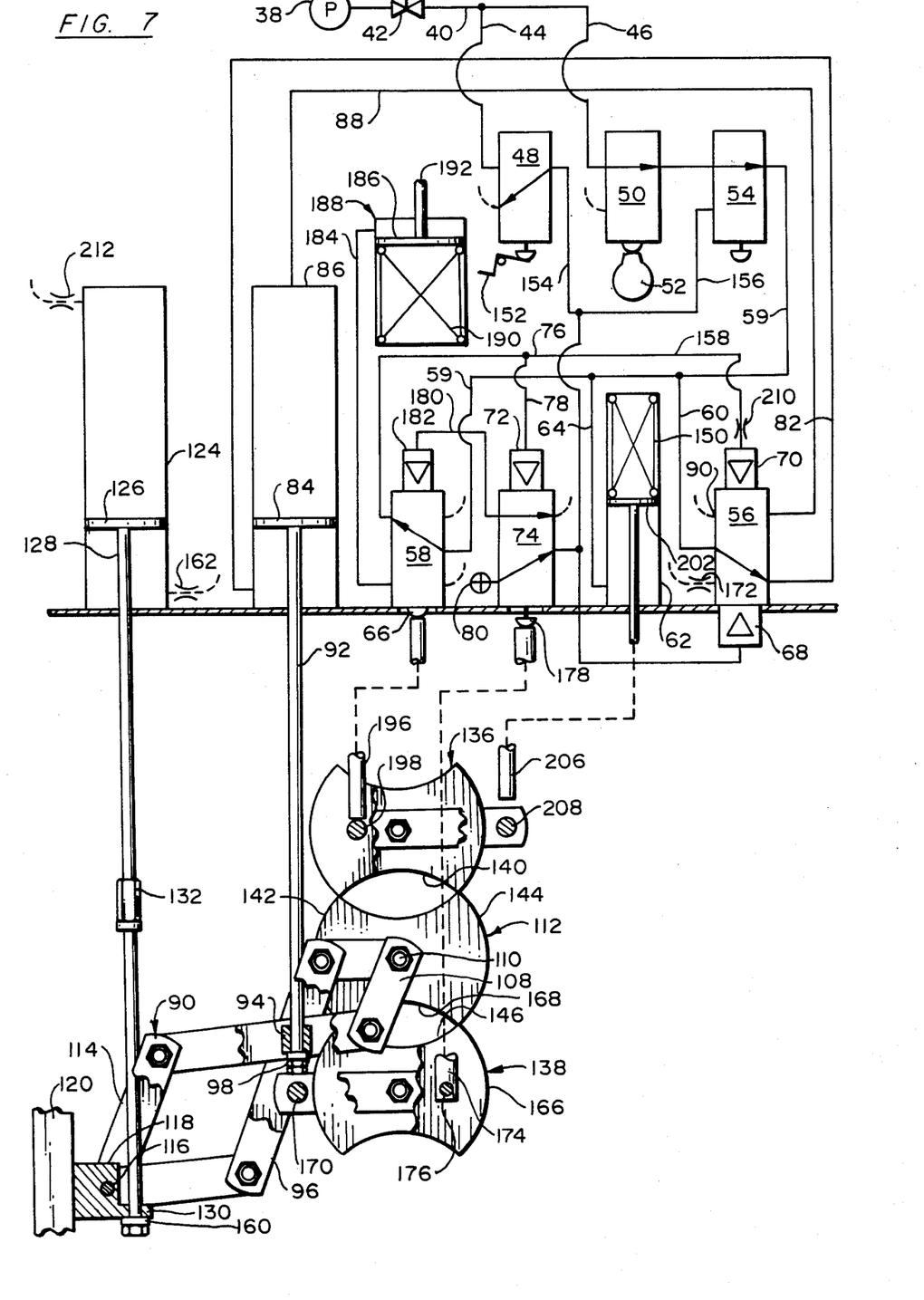

Turning now to FIG. 7, the barrier operating and locking device 36 and associated fluid circuit is depicted in a machine cycle-completed phase with gate 30 down and machine 10 idling at rest. Under these conditions, the crankshaft has restored cam 52 to its top stroke position to return normally closed cam controlled valve 50 to open condition. This action restores air to the machine cycling control valve 58, the gate linkage control valve 56 and to cylinder 62 which retracts, having no immediate effect, but rather, simply being reset for the next cycle.

While machine 10 may have been "single stroked," wherein the tripping signal was deactivated as described in FIG. 6, there always remains the possibility that machine 10 may not properly respond due to a malfunction in its clutch mechanism or other reason. In such an event, gate 30 should remain locked down in operative position to protect the operator until the machine itself stops at top stroke. The apparatus of this invention purposely introduces a delay to the shifting of gate linkage control valve 56 and consequently delays response of the gate drive cylinder 86 to lift gate 30 which delay is predetermined to be sufficiently long to ensure that machine 10 does not in fact "repeat" or make a second cycle, but rather, stops at top stroke.

To effect such delay, machine cycling control valve 58 is supplied air, restoring pilots 72 and 70 to a signal-on condition whereupon the interlock control valve 74 is immediately conditioned to be shifted. The action of pilot 70, which is a snap action pilot, is briefly delayed by a restriction 210 to the inlet of pilot 70 to permit adequate buildup in air pressure before it snaps forward to shift valve 56 into its position illustrated in FIG. 7.

During such delay, air flows through valve 56, which temporarily remains unshifted as in FIG. 6, and while air pressure above piston 84 of gate drive cylinder 86 is restored to hold lower cam assembly 138 in its locked position (as in FIG. 6) despite pressure applied by pilot 72 to shift interlock control valve 74, and through its valve stem 178 and plunger 174 to unlock lower cam assembly 138, the condition remains as in FIG. 6 until such time as pilot 70 operates in a snap action. At that time, valve 56 shifts to its position illustrated in FIG. 7, reversing the air supply and exhaust connections to gate drive cylinder 86. In the brief instant before nuts 98 on the terminal end of piston rod 92 move from the position shown in FIG. 6 to engage the lower surface of the connector 94 (FIG. 7) to lift gate 30, pilot 72 shifts the interlock control valve 74 and unlocks lower cam assembly 138 upon extension of valve stem 178 to depress plunger 174 and thereby rotate lower cam assembly 138 clockwise into unlocked relation to the master interlock cam assembly 112. If, for any reason, such action does not take place at that particular moment, operation of the gate drive cylinder rod 92 (tending to lift gate 30) would rotate master interlock cam assembly 112 forcibly clockwise (as viewed in FIG. 6) against lower cam assembly 138 and create sufficient friction to prevent pilot 72 from effectively functioning.

Immediately after lower cam assembly 138 has been rotated clockwise from its position in FIG. 6 to that shown in FIG. 6, the master interlock cam assembly 112 is free to rotate clockwise in following relation to its associated pantograph linkage 90 as gate 30 is driven upwardly under the influence of the gate drive cylinder action. Upward gate movement is cushioned by a buffer cylinder line restriction 212 in a manner similar to the cushioning action on its downstroke in FIG. 4. Thereupon, the safety apparatus 20 is restored to the condition shown in FIG. 3 and is automatically reset for the next cycle.

As will be apparent to persons skilled in the art, various modifications, adaptations and variations of the foregoing specific disclosure can be made without departing from the teachings of the present invention.

I claim:

1. Safety apparatus for a machine such as a power press and the like and comprising a barrier movable between a starting position in remote relation to a work area and an operative position in obstructing relation thereto precluding operator access, first and second cams for controlling machine cycling, an interlock cam cooperating with the first and second cams and drivingly connected to the barrier for rotation in synchronism with barrier movement, a machine tripping device for actuating power operation of the machine responsive to rotation of the first and second cams, the interlock cam locking the first and second cams against rotation when the barrier is in any position other than its operative position.

2. The apparatus of claim 1 wherein the barrier includes a movable transparent gate precluding operator access to the machine work area while providing full visibility thereof.

3. The apparatus of claim 1 further including a double acting barrier drive cylinder and reciprocating piston rod drivingly connected to the barrier, and manually actuated valve control means for controlling extension and retraction of said piston rod for moving the barrier between said starting and operative positions.

4. Safety apparatus for a machine such as a power press and the like and comprising a barrier movable between a starting position in remote relation to a work area and an operative position in obstructing relation thereto precluding operator access, a mechanical operating and locking device drivingly connected to the barrier for moving it between its starting and operative positions and releasably locking the barrier in operative position, a machine tripping device for actuating power operation of the machine, fluid circuit means connected between the barrier operating and locking device and the machine tripping device for controlling both said devices, the fluid circuit means including selectively operable machine tripping valve means for actuating the machine tripping device, said machine tripping device being operated by said fluid circuit means responsive to a signal from the barrier operating and locking device indicative of the barrier in being locked operative position, the barrier operating and locking device including rotary cam means conducted to said machine tripping valve means for operating the same responsive to rotation of said rotary cam means, and means for positively locking the rotary cam means against rotation for precluding operation of the machine tripping valve means when the barrier is in any position other than said operative position.

5. The apparatus of claim 4 wherein said rotary cam locking means includes a rotary master interlock cam cooperating with said rotary cam means, the rotary master interlock cam being drivingly connected to the barrier for rotation in synchronism with barrier movement, the interlock cam locking the rotary cam means against rotation during barrier movement, thereby positively precluding operation of the machine tripping valve means.

6. The apparatus of claim 5 wherein the interlock cam is movable into a predetermined stationary machine cycling position upon the barrier being moved into said operative position, the rotary cam means being rotatable relative to the interlock cam solely upon its being disposed in its stationary machine cycling position for operating the machine tripping valve means to actuate the machine tripping device.

7. The apparatus of claim 6 wherein angular movement of the rotary cam means relative to the interlock cam in its stationary machine cycling position simultaneously locks the rotary master interlock cam against rotational movement for securing the barrier in locked operative position.

8. The apparatus of claim 4 wherein the fluid circuit means includes a machine operated cam controlled valve operable in response to machine cycling for deactivating the machine tripping valve means and effecting single stroke machine operation responsive to a single machine tripping signal from the machine tripping valve means.

9. Safety apparatus for a machine such as a power press and the like and comprising a barrier movable between a starting position in remote relation to a work area and an operative position in obstructing relation thereto precluding operator access, a mechanical operating and locking device drivingly connected to the barrier for moving it between its starting and operative positions and releasably locking the barrier in operative position, the barrier operating and locking device including a buffer cylinder and reciprocable piston having an exposed piston rod with a pair of longitudinally spaced enlarged diameter portions, the barrier operating and locking device being connected to the exposed piston rod for free sliding movement thereon between its enlarged diameter portions, responsive to movement of the barrier between its starting and operative positions for maximizing the speed of initial barrier descent, a machine tripping device for actuating power operation of the machine, and fluid circuit means connected between the barrier operating and locking device and the machine tripping device for controlling both said devices, said machine tripping device being operated by said fluid circuit means responsive to a signal from the barrier operating and locking device indicative of the barrier being in locked operative position.

10. The apparatus of claim 9 wherein the buffer cylinder has a vent line restriction below its piston for cushioning barrier descent upon engagement between the barrier operating and locking device and the lower enlarged diameter portion of the piston rod.

11. Safety apparatus for a machine such as a power press and the like and comprising a barrier movable between a starting position in remote relation to a work area and an operative position in obstructing relation thereto precluding operator access, a mechanical operating and locking device drivingly connected to the barrier for moving it between its starting and operative positions and releasably locking the barrier in operative position, a machine tripping device for actuating power operation of the machine, and fluid circuit means connected between the barrier operating and locking device and the machine tripping device for controlling both said devices, said machine tripping device being operated by said fluid circuit means responsive to a signal from the barrier operating and locking device indicative of the barrier being in locked operative position, the fluid circuit means including a double acting barrier drive cylinder and reciprocating piston rod drivingly connected to the barrier operating and locking device, manually actuated valve control means for controlling extension and retraction of said piston rod for moving the barrier between said starting and operative positions, the barrier operating and driving device including first and second cams supported for independent rotation about spaced parallel axes and a master interlock cam interlockingly engageable with the first and second cams, the master interlock cam being drivingly connected to the barrier and rotatable in synchronism with barrier movement, the interlock cam being movable into a predetermined stationary machine cycling position upon the barrier being moved into its operative position, the first and second cams being rotatable relative to the master interlock cam solely upon its being disposed in said cycling position, the barrier drive piston rod controlling rotary movement of the master interlock cam between a ready position corresponding to the barrier starting position, and said machine cycling position corresponding to the barrier operative position.

12. The apparatus of claim 11 wherein the barrier drive piston rod is engageable with the first cam when the master interlock cam is in machine cycling position for rotating the first cam in a first angular direction to lock the interlock cam and the barrier in their respective machine cycling and operative positions.

13. The apparatus of claim 12 wherein the fluid circuit means includes adjustable throttling means for governing fluid discharge from the barrier drive cylinder for synchronizing movement of the piston rod in timed relation to the barrier movement to prevent premature piston rod engagement with the first cam before the master interlock cam is in its machine cycling position.

14. The apparatus of claim 12 wherein the fluid circuit means further includes cooperating first and second machine tripping valves, the second machine tripping valve controlling the machine tripping device, wherein a drive actuator is connected between the first cam and first machine tripping valve, and wherein rotation of said first cam responsive to actuation of the barrier drive piston rod causes the drive actuator to shift the first machine tripping valve to activate the second machine tripping valve for operating the machine tripping device and effect machine cycling.

15. The apparatus of claim 14 wherein a second drive actuator is connected between the second machine tripping valve and second cam, and wherein the second machine tripping valve, upon being activated, simultaneously drives the second drive actuator to rotate the second cam relative to the interlock cam in its machine cycling position to mechanically block its rotary movement in cooperation with the first cam and positively lock the barrier in operative position.

16. The apparatus of claim 14 wherein said activation of said second machine tripping valve simultaneously deactivates the barrier drive cylinder and the first machine tripping valve to secure the same in the last position to which they were shifted to positively preclude barrier movement from its operative position and to maintain the first cam in mechanical locking engagement with the interlock cam during machine cycling.

17. The apparatus of claim 14 wherein the fluid circuit means further includes a control cylinder for controlling the second machine tripping valve, the control cylinder having a piston rod drivingly engageable with the second cam, a machine operated cam controlled valve, and means connecting the cam controlled valve to said control cylinder, and wherein the cam controlled valve is moved to a first position during machine cycling to operate the control cylinder and drive its piston rod into driving engagement with the second cam for rotating it in an angular direction, opposite said first angular direction, into non-interfering relation to the interlock cam, whereby said rotary movement of the second cam moves the second drive actuator to shift the second machine tripping valve and de-activate the machine tripping device to limit machine cycling to a single stroke.

18. The apparatus of claim 17 wherein the cam controlled valve is moved to a second position upon single stroke machine cycling, and wherein the cam controlled valve in said second position is operable to reset and actuate the second machine tripping valve, its control cylinder, the barrier drive cylinder and the first machine tripping valve, the latter causing said first drive actuator to rotate the first cam in an angular direction opposite said first angular direction into non-interfering relation to the interlock cam, whereby the barrier is returned into starting position by the piston rod of the actuated barrier drive cylinder.

* * * * *